United States Patent [19]

Vinal et al.

[11] Patent Number: 4,860,138
[45] Date of Patent: Aug. 22, 1989

[54] DIFFERENTIALLY SENSITIVE SINGLE TRACK READ/WRITE HEAD DESIGN WITH IMPROVED BIASING

[75] Inventors: Albert W. Vinal, Cary, N.C.; Earl A. Cunningham, Rochester, Minn.

[73] Assignee: International Business Machines Corp., Armonk, N.Y.

[21] Appl. No.: 119,501

[22] Filed: Nov. 12, 1987

[51] Int. Cl.⁴ .............................................. G11B 5/39
[52] U.S. Cl. .................................................... 360/113
[58] Field of Search ........................................ 360/113

[56] References Cited

U.S. PATENT DOCUMENTS

| 4,100,583 | 7/1978 | Koel et al. | 360/113 |
| 4,589,041 | 5/1986 | Voegeli | 360/113 |
| 4,626,946 | 12/1986 | Vinal | 360/113 |
| 4,698,711 | 10/1987 | Vinal | 360/113 |
| 4,782,415 | 11/1988 | Vinal | 360/113 |

Primary Examiner—Robert S. Tupper
Attorney, Agent, or Firm—Edward H. Duffield

[57] ABSTRACT

A simplified structure for a single track read/write head design is disclosed. The design incorporates a simplified write coil structure and an improved and simplified combined magnetic bias and sensor current structure. The active sensing current is utilized both to create an anti-parallel magnetic vector couple in a coupled film magneto resistive sensor and to magnetically bias or torque the anti-parallel couple so that magnetization within the sensor films lies at an angle with the easy magnetic axis. Sensor current is fed in series through an electro-magnetic coil wrapped about the magneto resistive sensor so that sense current simultaneously creates an anti-parallel magnetic vector couple in the sensor and generates an electromagnetic bias field to torque the anti-parallel couple at an angle with the easy axis of magnetization. An improved spirally laid-out planar deposited writing flux coil is positioned about the writing electromagnetic core which greatly simplifies fabrication steps in making the device.

4 Claims, 5 Drawing Sheets

DIFFERENTIALLY SENSITIVE SINGLE TRACK READ/WRITE HEAD DESIGN WITH IMPROVED BIASING

RELATED APPLICATIONS

This application is related to my simultaneously filed, commonly assigned co-pending application Ser. No. 119,502, now U.S. Pat. No. 4,816,947, which discloses the basic structure of the single track differentially sensitive read/write head design but which lacks the improved write flux generation structure and improved sense current and magnetic biasing flux field generation structure of the present disclosure.

FIELD OF THE INVENTION

The invention is related to magnetic recording read/write head structures in general and in particular to read/write heads employing solid state rather than inductive sensors.

PRIOR ART

A variety of prior patents dealing with read/write head structures in this field are known to exist. Those having a magneto resistive or other solid state sensor located remote from the recording medium are exemplified by U.S. Pat. Nos. 3,921,217, 4,034,414 and 4,065,797. None of these patents represent an effective solution to the problem of employing remotely positioned solid state sensors in a single track read/write head structure since they either lack a differential signal output for common mode noise rejection, offer no control of Barkhausen noise generation or are not provided with a truly effective means of magnetically biasing the magneto resistive sensor element without coupling some of the longitudinal magnetic sensor flux into the record medium which interferes with the reading or writing of data thereon. For example, the aforementioned U.S. Pat. No. 4,065,797 has magneto resistive sensors with one sensor used for each track of data. The magneto resistive sensors are biased in a plane that is perpendicular to the surface of the recording medium and the longitudinal component of sensor flux will be conducted into the recording medium by virtue of the arrangement of the physical structure employed. This is a most undesirable result as will be readily appreciated by those of skill in the art since biasing magnetization within the sensor produces a flux density of 0.07 Tesla which is longitudinally oriented and a significant fraction of this flux is coupled into the magnetic record medium which can erase or seriously interfere with recording and reading of data therefrom.

U.S. Pat. No. 4,034,414 illustrates a similar difficulty, but one in which the interference between the biasing field and the recording medium is slightly reduced by orienting the biasing field insofar as possible approximately parallel with the surface of the recording medium but in which the angle between the biasing plate and the magneto resistance element is optimal at about 45°. This necessitates angling of the biasing plate with respect to the record medium. Unfortunately, a significant portion of the longitudinal magnetic flux flowing in the sensor is coupled into the medium. The design similarly does not employ differential sensors nor is the flux path from the record medium through the sensor capable of supporting and energizing two sensors in a differential mode.

U.S. Pat. No. 3,921,217 shows the essential aspect of removing a magneto resistive sensor from the proximity of the magnetic medium by providing a flux conducting coupling leg to carry flux from the medium through the sensor and through a return path back to the medium. However, when the sensor is biased this structure will also couple an unwanted magnetic field to the medium and it does not allow for differential signal sensing and provides no control over Barkhausen noise.

U.S. Pat. No. 3,921,217 alludes to the fact that magneto resistive sensors require a magnetic bias as well and that in some cases both types of bias can be produced by a single current by connecting the magneto resistive element in series with the bias conductor. However, as disclosed therein, the bias conductor is a planar member running parallel with the surface of the MR sensor and conducting current in a path generally orthogonal to the axis of magnetization as is the case in U.S. Pat. No. 4,034,414. This leads to unwanted intense coupling of the longitudinal component of sensor flux to the magnetic record medium during biasing of the sensor magnetization direction for which no solution is proposed in the aforementioned U.S. Pat. No. 3,921,217.

OBJECTS OF THE INVENTION

It is an object of the present invention to provide an improved means of magnetically biasing and electrically energizing magneto resistive sensors in differentially sensitive read/write head structures.

BRIEF SUMMARY

The foregoing and still other objects not specifically enumerated are provided in the present invention by constructing helical bias coils to surround the active sensor legs as disclosed in my aforementioned commonly-assigned co-pending and simultaneously filed application Ser. No. 119,502. Rather than construct the biasing coils around separate magnetic core structures to couple magnetic flux to bias the magneto resistive sensors, it has been found that by careful selection of the sensing current magnitude and the number of Amp turns in the biasing coil surrounding the sensor, that the sensor current itself is capable of self-biasing the magnetic vectors off the easy axis. In addition, rather than construct a helically wound magnetic flux generation coil for writing, it has been found that generating a spiral planar coil about a vertical leg of the writing core structure is simpler and provides for much less interference possibility with adjacent components.

DETAILED SPECIFICATION

Figure 1:
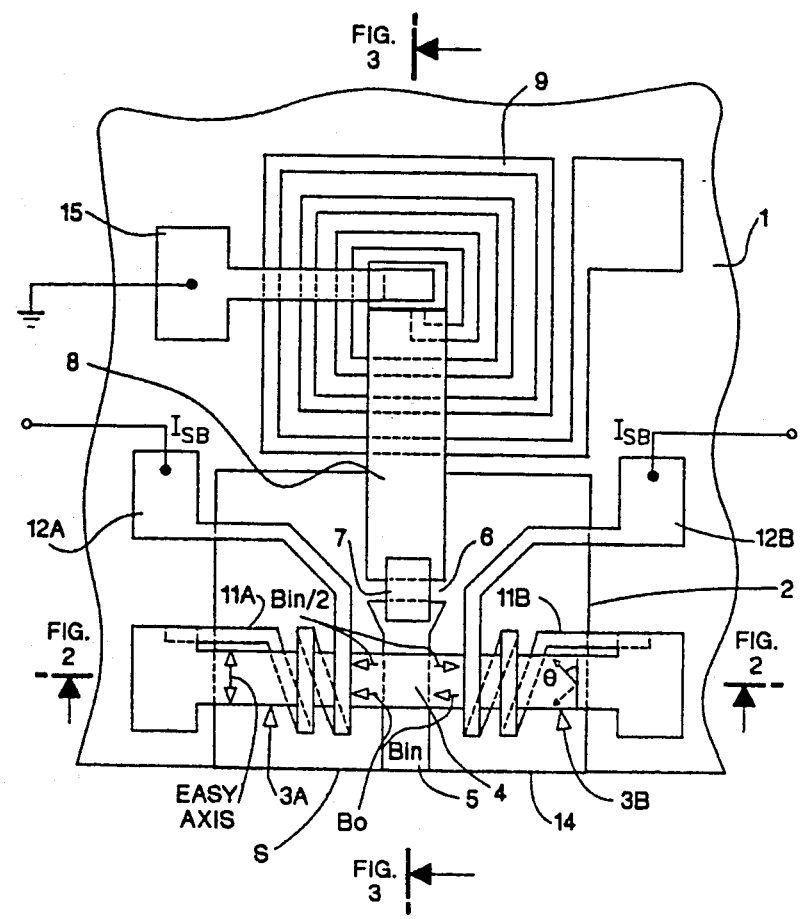
FIG. 1 illustrates a planar view of a solid state read/write differential sensing single track head design.

Turning to FIG. 1 of the drawings, a plan or head layout view showing the elements of the magnetic read/write head in a preferred embodiment of the invention is shown. A magnetically permeable electrically non-conductive block of ferrite material 1 serves as a substrate or base upon which to build the elements of the magneto resistive sensor and various flux conductors according to this invention. Normal photo lithography and deposition techniques well known to those of skill in the art are employed and will not be described in further detail herein.

The end surface of the ferrite block 1 has been etched initially in a trenched area shown generally by the line 2. This area is then filled with glass or similar electrically and magnetically non-conductive material. This has the effect of separating the magnetically and electrically conductive elements which are to be deposited within the general area of the trenched out zone 2 from the ferrite block surface to minimize leakage paths for magnetic flux where critical.

A magneto resistive sensor 3, which has been bifurcated or intersected at its center to form left half 3A and right half 3B, is deposited on the top surface of the glass which fills the area 2.

The sensor halves 3A and 3B may be formed of two individual magneto resistive sensors. The two sensor areas form active magnetically sensitive legs which are joined at a common magnetically permeable connection at their center area 4. There, they intersect with a magnetically permeable flux conductor 5 lying in contact or in close physical proximity with the surface of the magneto resistive sensor strip which forms halves 3A and 3B for a tight and close flux coupling. The flux conductor 5 conducts flux from the medium which was located adjacent to end surface S of the ferrite block 1. It will be understood by those of skill in the art that a suitable magnetic record medium would be located parallel to surface S and relative motion between the read/write head and the record medium would occur in the direction running in and out of the plane of the drawing paper.

The magneto resistive sensor 3 is shown with its easy axis of magnetic anisotropy oriented perpendicular to the long direction of the sensor. Magnetic flux coupled from the flux conductor 5 will divide in the central area 4 joining the two sensor halves and pass equally in the left and right halves 3A and 3B along the longitudinal axis of the sensors to rotate the magnetic vectors in each magneto resistive sensor half in opposite directions, i.e., the rotation in the vectors in the left half, for example, being opposite to that in the right half, for example. This provides a differential sensing component.

The magnetic vectors are torqued to their active off-easy axis position by the sensor current $I_s$ supplied at terminals 12A and 12B and partially conducted through a central metal layer. An insulative material having non-magnetic properties may also be used as disclosed in my aforementioned U.S. Pat. No. 4,626,946 and seen to better effect in a cross-sectional views, a description of which follows. The sensor current $I_s$ conducted through the magnetic films and, to a small extent, through the central conductive layer, has the effect of sustaining a mutually anti-parallel magnetic couple aligned parallel with the easy axis of magnetization in the preferred coupled thin film magneto resistive sensor structure which is shown in these drawings. It also has the effect of eliminating any interfering 180° domain walls within the magnetic films that would otherwise give rise to Barkhausen noise.

Magnetic biasing to torque the magnetic vector in the thin magnetic films off of the easy axis, is provided by the electromagnetic coils 11A, 11B. The magnetic flux flows through the sensor leg pair and into the ferrite block 1. This path passes through the ferrite block 1 to form a complete closed loop so that no component of magnetic flux flowing in the sensor exits from the end surface S into the magnetic record medium to interfere therewith.

A gap to prevent the loss of flux from the flux conductive member 5 during read-back of recorded signals from the medium is shown as a gap 6 having an intervening electrical but non-magnetic conductor 7. This may be gold or aluminum or any other similarly electrically conductive element which connects, via the electrically conductive flux conductor member 5, to carry the sensing current $I_s$ to ground 15 as shown at the top of FIG. 1. Core 8 is of permalloy, or other similarly magnetic and electrically conductive material, and is utilized during writing of data on a magnetic record medium. Suitable electrical signal impulses would be applied to spiral winding 9 to generate an intense electromagnetic field in core 8 which is coupled through the gap 6 to the flux conducting member 5 for application to the record medium. Write coil winding 9 is a flat sprial rather than a wound helix. This surrounds an upstanding portion of core 8 (seen to better advantage in FIG. 3) and is much easier to fabricate than would be a multiple mask level, three-dimensional helix wrapped about the length of core 8. As disclosed in my aforementioned U.S. Pat. No. 4,626,946, the coupled film magneto resistive sensor 3A, 3B will be saturated magnetically during writing and will not conduct flux further once a critical field has been reached. This fact permits writing to occur utilizing the same flux conductive pole piece 5 as is used for read-back when the write winding 9 is no longer energized.

Figure 2:
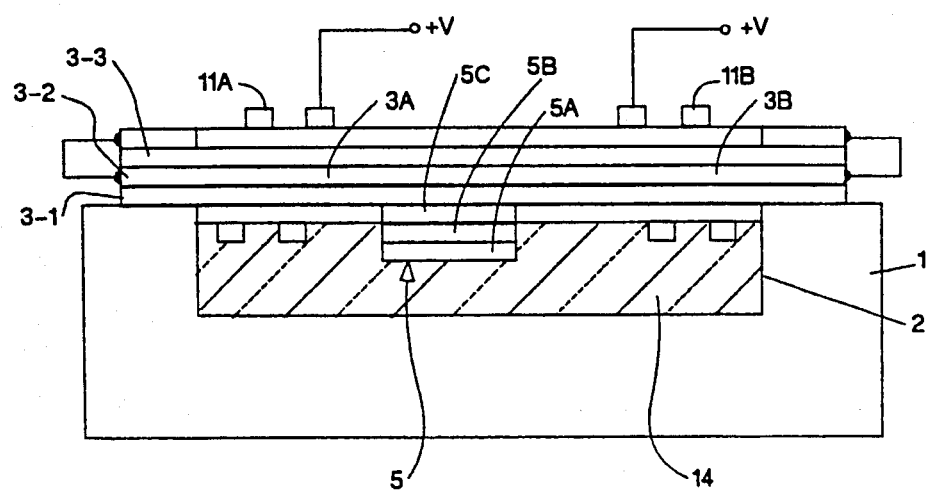
FIG. 2 illustrates a horizontal cross-section taken along section lines as shown in FIG. 1.

Turning to FIG. 2, the cross-sectional view along lines AA in FIG. 1 is illustrated. It may be seen that the ferrite block 1 has initially been etched or milled away to form a trench or recess 2 which is later filled with glass or other suitable non-magnetic, non-electrically conductive material 14. Thereon are deposited a first layer for the magnetic flux coupling and electrically conductive probe 5, such as layer 5A of permalloy, for example. A sandwich-type structure is contemplated to eliminate domain walls and Barkhausen noise, so another layer of non-magnetic and electrically conductive metal such as titanium is deposited as layer 5B followed by yet another layer of permalloy, layer 5C. The gap 6 (which may be seen in FIG. 1) is then etched away and filled with non-magnetic electrically conductive material 7. This completes electrical connection to the core 8 of the writing electromagnet which has previously had the lower lahyer for its winding 9 deposited in the glass surface, i.e., glass filling 14 would extend up to a first level. Then the copper or aluminum winding bars would be laid down followed by further deposition of glass or insulator up to a level even with the top of the trenched out area 2 in the ferrite block 1.

Next, the sensor 3 is laid down in a uniaxial magnetic field to accomplish uniaxial anisotropy with easy axis orientation as shown in FIG. 1 generally perpendicular with the long direction of the sensor. This also comprises a metal sandwich layer of permalloy, non-magnetic metal and further magnetic permalloy as shown by layers 3-1, 3-2 and 3-3 and as described in great detail in my aforementioned U.S. Pat. No. 4,626,946 which describes such sensors.

It may be seen that the flux coupling path from the recording medium during read-back would be from the recording medium, which may be recorded vertically, into the end face of the coupling member 5 and from there into the underside of the magnetic sensor active legs 3A and 3B where it divides evenly as shown in FIG. 1 to pass through the left and right sensor legs 3A, 3B. The gap 6 as shown in FIG. 1 which is filled with an electrically conductive but non-magnetic material. The purpose of the gap is to provide a higher reluctance path than that which exists between the flux coupling leg 5 and the active sensor legs 3A, 3B so that the majority of flux coupled from the medium passes through the sensors and the magnetic ferrite block.

Layer 3-2 conducts a portion of the sensor current $I_s$ which establishes the anti-parallel arrangement of magnetization within the upper and lower magnetic film layers 3-1 and 3-3 as disclosed in my aforementioned U.S. Pat. No. 4,626,946. The current is conducted away to ground by the ground connection 15 (FIG. 1) through the upper layer of the core material 8 forming the writing electromagnet. Returning to FIG. 3, core 8 may be formed of a similar sandwich of metals as described for the flux conductor 5 or for the coupled film magneto resistive sensors 3. It is only required that it be electrically and magnetically conductive for the present design. Conductor 7 is electrically conductive but non-magnetic as will be appreciated.

The magnetic field biasing arrangement used to torque magnetization within the coupled film magneto resistive sensors 3A, 3B away from the easy axis is illustrated in FIG. 1, and in FIG. 2, the cross section as shown in FIG. 1. The coupled film magneto resistive sensor 3 is supplied with its sensing current as schematically shown by the terminal 12A and 12B in FIG. 1. During read-back of recorded data bits from a record medium located adjacent to the surface S, magnetic flux is generated in the sensors 3A, 3B by passing an appropriate current through terminals 12A, 12B and ground 15 via the windings 11A, 11B shown in FIGS. 1 and 2. The magnetic flux thus generated is coupled entirely into the coupled film magneto resistive sensors 3, passing longitudinally through them as with the sensor's inherent magnetization in the longitudinal direction and back through the ferrite block 1. The magnetic biasing flux path is a closed loop and has no components which exit from the surface S to interfere with data written on magnetic medium adjacent to surface S. The magnetic bias flux torques the magnetization within the MR sensor films to rest at an angle relative to the easy axis which is shown to be perpendicular to the length of the sensors 3A, 3B in FIG. 1.

As noted, it is not necessary that the easy axis be orthogonal to the long axis. Instead, it may be chosen to be parallel with the long axis of the sensors 3A and 3B, thus making it possible to utilize the sensor current passed through terminals 12A and 12B to provide both magnetic biasing and sensing current.

It will be appreciated that what has been described with reference to FIGS. 1 through 3 constitutes a single pole, single track differentially sensitive read/write structure for vertical recording in a magnetic medium. It is often desirable to write in a wider track and to read back in a narrow track to avoid difficulties with head tracking mechanical misregistration as will be readily understood by those of skill in this field. In order to provide an effective write wide, read narrow structure, the alternative embodiment as shown in FIG. 4 is offered.

Figure 4:
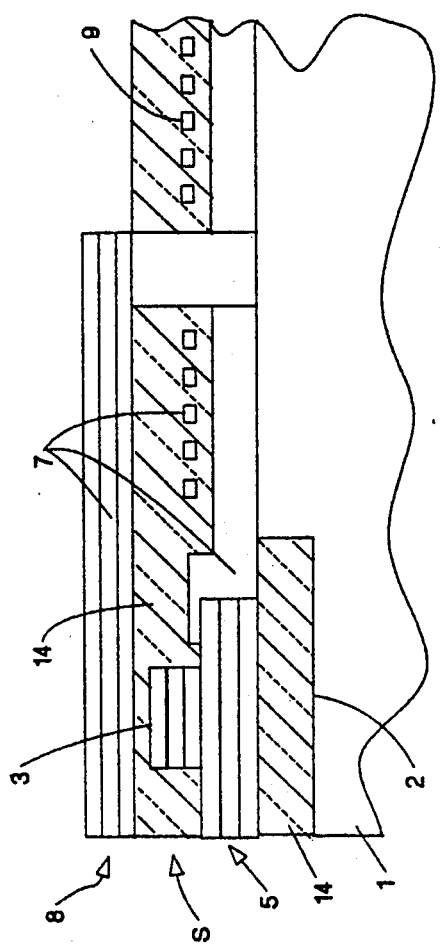
FIG. 4 illustrates an alternative embodiment of a structure like that in FIGS. 1-3 but which includes a second flux conducting member for writing in a wide path.

In the structure shown in FIG. 4, the coupling member 5 which couples flux to or from the medium has a width $W_r$ for reading, while the pole piece 8, which is the core for the electromagnet used in writing, is extended and has a width $W_w$ where it interfaces surface S. The write probe width $W_w$ is wider than that of the read pole piece or flux coupling member 5. It will be understood that layer 8 overlies layer 5 and is separated therefrom by a suitable insulator of suitable thickness to minimize leakage flux coupling losses back to the flux coupling member 5 from the pole piece 8.

Figure 3:
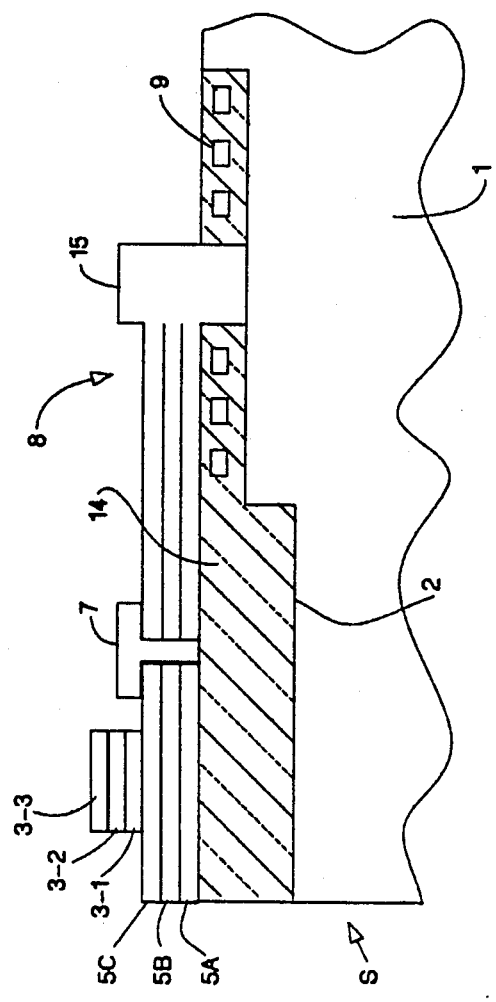
FIG. 3 illustrates a vertical cross section taken along section lines as shown in FIG. 1.

The remaining portion of the structure shown in FIG. 4 is essentially the same as that shown in FIGS. 1 through 3 with the exception that the magnetic gap 6 may now extend from the end of the flux coupling leg 5 after it has passed under sensor leg 3, all the way back to the terminus of the filled area 2.

Figure 5:
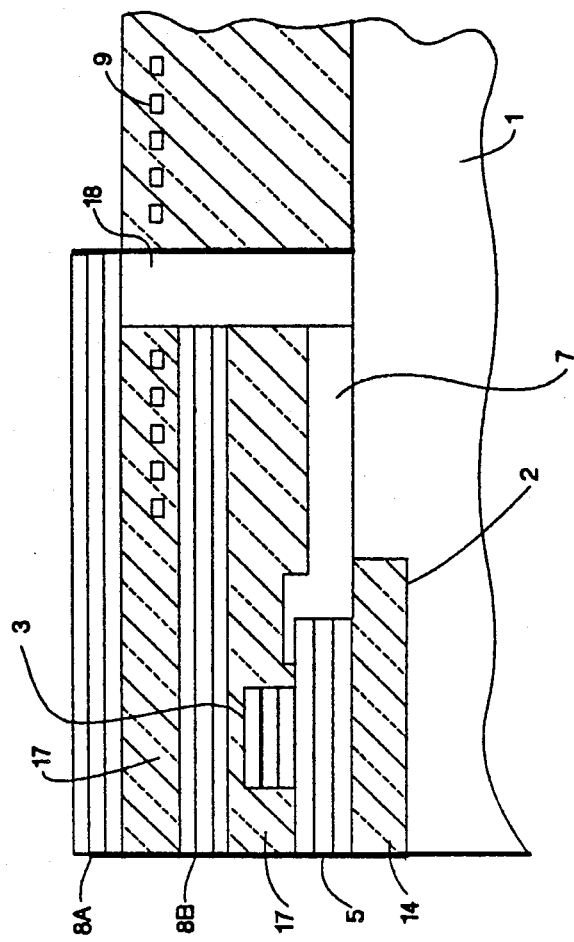
FIG. 5 illustrates a further modified embodiment of that similar to the one shown in FIG. 4 but which incorporates yet another flux conducting member for writing longitudinally recorded data.

FIG. 5 illustrates a central vertical section taken along section line as shown in a device of the type in FIG. 1, but modified to provide for longitudinal recording. The central read-back flux coupling leg 5 is constructed in similar fashion to that shown in the aforementioned figures and couples flux read back from the record medium to the magneto resistive sensors 3 in the same fashion as before. Sensor current from the central layer of the sensors 3 is conducted away through metal 7 to electrical ground 15, FIG. 1, as before. The magnetic biasing flux means is not seen in cross section in FIG. 5 because that section is not represented in FIG. 5. Its structure would be the same as that previously described with respect to FIG. 2.

The write flux generating core 8 has a winding 9 as previously illustrated with respect to FIGS. 1 and 2. However, core 8 has two legs which extend all the way down to the surface S of the ferrite block and are used to record or impress horizontal magnetization patterns in a magnetic record medium, not shown. The pole pieces at the end faces of the flux coupling members 5 and 8 are separated from one another by a space filled with glass or insulator 17 of sufficient thickness to separate the pole pieces to a greater reluctance path than that which would be exhibited between the end faces of the pole pieces and the magnetic record medium.

This alternative embodiment of the invention as shown in FIGS. 1 through 5 can be constructed to write and to read longitudinally recorded patterns in a magnetic record medium. The modifications are seen to best advantage in FIG. 5.

In FIG. 5, electromagnetic writing core 8 is bifurcated into two legs, 8A and 8B, joined by a bridging structure 18 of permalloy or other suitably magnetic and electrically conductive material. The winding 9 for energizing for writing is as described with reference to the foregoing figures. Sensor 3 and the flux coupling member 5 are also as previously described. The end faces of the core 8 represent pole pieces 8A and 8B to confront a magnetic record medium and to simultaneously couple flux into and out of the medium in a longitudinal path for longitudinal rather than vertical recording. In read-back mode, flux is coupled from the fringent fields at the flux reversal boundaries in the record medium through the end face of the pole piece 5 and into the ferrite block 1. The flux coupled into the pole piece 5 passes through the sensors 3 and back into the ferrite block as shown in FIG. 1 as it does with the other configurations illustrated.

It will be appreciated that what has been described is an improved magnetic read/write head structure that is capable of providing a differentially sensitive configuration with magnetic biasing paths that do not intersect with the magnetic recording medium. Both vertical and horizontal read/write structures utilizing the basic design for the sensitive elements and biasing structure have been shown. As will be readily apparent to those of ordinary skill in the art, numerous modifications in the detail of structure may be contemplated without departing from the spirit and scope of the invention herein. Therefore, what is desired to be protected by Letters Patent is shown in the claims appended hereto by way of illustration only and not by way of limitation.

What is claimed is:

1. A magnetic head apparatus, comprising:
   at least two magnetically permeable active magnetic sensor legs for developing electrical signals in response to magnetic flux said legs being joined at a first common magnetically permeable connection;
   a first magnetically permeable flux conducting means for conducting magnetic flux to or from and having a surface confronting a magnetic record medium;
   said first flux conducting means being magnetically connected to said first common connection, and thereby to said magnetic sensor legs to conduct flux thereto or therefrom;
   said magnetic sensor legs comprising a magneto resistive element; and,
   a magnetic biasing means comprising a source of constant magnetic flux and means for applying said flux to said active sensor legs for biasing their inherent magnetism at an angle with respect to the easy axis of magnetization within said legs, wherein said means for biasing comprises electromagnetic coils placed about sensor legs and supplied with the electrical sensing current through said sensor legs in series.

2. Apparatus as described in claim 1, further comprising:
   means for applying magnetic recording flux signals to said first flux conducting means to record said magnetic flux signals on a magnetic record medium.

3. Apparatus as described in claim 2, further comprising:
   a magnetic reluctance means in serial magnetic circuit connection between said means for applying said flux and said first flux conducting means.

4. Apparatus as described in claims 2 or 3, wherein:
   said means for applying magnetic recording flux signals to said first flux conducting means comprises a planar spiral of conductive material.

* * * * *